United States Patent

Lo et al.

[11] Patent Number: 5,956,562
[45] Date of Patent: Sep. 21, 1999

[54] ELECTRODE PLATE FOR USE IN OZONE GENERATORS WITH STAGGERED AIR VENTS

[75] Inventors: Shih-Che Lo, Ilan; Ming-Jye Tsai, Changhua; Ray-Ten Chen; Tung-Chuan Wu, both of Hsinchu, all of Taiwan

[73] Assignee: Industrial Technology Research Institute, Hsinchu, Taiwan

[21] Appl. No.: 08/887,538

[22] Filed: Jul. 3, 1997

[51] Int. Cl.$^6$ .................................................. B01J 19/08
[52] U.S. Cl. ................................. 422/186.2; 422/186.07
[58] Field of Search ............................. 422/186.07, 186.2

[56] References Cited

U.S. PATENT DOCUMENTS 5,154,895 10/1992 Moon .................................. 422/186.07
5,549,874 8/1996 Kamiya et al. ..................... 422/186.07

*Primary Examiner*—K. Mayekar
*Attorney, Agent, or Firm*—W. Wayne Liauh

[57] ABSTRACT

An electrode plate for use in an ozone generator containing a plurality of air vents. It includes: (a) a cathode electrode connected to a low voltage terminal and having a plurality of discharge portions at one side; (b) an anode electrode connected to a high voltage terminal for acting with the cathode electrode; and (c) an insulative layer sandwiched between the cathode electrode and the anode electrode, keeping the discharge portions to be spaced from the anode electrode within hundred micrometers. The cathode electrode and the anode electrode each comprises a plurality of air vents arranged in a staggered manner.

6 Claims, 6 Drawing Sheets

ELECTRODE PLATE FOR USE IN OZONE GENERATORS WITH STAGGERED AIR VENTS

BACKGROUND OF THE INVENTION

The present invention relates to a method of fabricating an electrode plate for an ozone generator, and more particularly to such an electrode plate made by semiconductor micromachining technique.

Conventionally ultraviolet activating method and electric discharge method are commonly used to generate ozone. Ozone is generally formed by the action of oxygen atoms on oxygen molecules. The method of generating ozone by electric discharge is to split the oxygen molecules into oxygen atoms with corona discharge. According to the principle of electric discharge, the density of discharge current has great concern with the intensity of electric field at the surface of cathode electrode, i.e., the higher the intensity of electrode field, the higher the density of discharge current. The intensity of electric field is determined subject to the space between the cathode electrode and the anode electrode, i.e., the smaller the space, the higher the intensity of electric field. Further, the intensity of electric field is also determined subject to the surface geometric configuration of the cathode electrode. The intensity of electric field is higher at a sharper tip or edge, and it is lower at a flat surface. The value of discharge current is obtained from multiplying the density of discharge current by discharge area. Under a constant voltage, the discharge power becomes higher when the discharge current is raised, and relatively higher concentration of ozone can be produced. Therefore, an ideal ozone generator has a small discharge space between the cathode electrode and anode electrode, and the radius of curvature of the tip or edge of the discharge portions thereof is small.

Regular ozone generators are commonly made by conventional mechanical machinery. Exemplars are disclosed in U.S. Pat. No. 4,882,129, entitled "OZONE GENERATOR CELL", and U.S. Pat. No. 4,992,246, entitled "OZONIZER". The former teaches the installation of a thin ceramic sheet sandwiched between a perforated metallic sheet serving as cathode electrode and a water-cooled aluminum base. Dry air or oxygen is passed over the electrode surface and a high-voltage, high-frequency electric field is applied between the electrode and the base for a corona discharge. The later teaches the installation of a first electrode comprising blades, a second electrode comprising a casing, enabling the blades and the casing to form a blower. This arrangement makes it unnecessary to provide an apparatus for causing a corona discharge, and a blower for supplying oxygen to the discharge space and taking out the respectively generated ozone.

According to the aforesaid structures, the discharge space and the radius of the discharge tips (discharge portions) cannot be minimized thereby. Therefore, in order to generate the ozone, the applied voltage must be very high. However, the high applied voltage will consume more energy and tend to incur danger.

Further, according to the principle of discharge, the density of discharge current has a great concern with the intensity of electric field at the surface of the discharge portion on the cathode electrode, i.e., the higher the intensity of electric field is, the higher the density of discharge current will be, and the intensity of electric field is directly proportional to the discharge space between the cathode electrode and the anode electrode, i.e., the smaller the discharge space is, the higher the intensity of the electric field will be. In addition, the surface geometric configuration of the cathode electrode also concerns the intensity of electric field as indicated above.

SUMMARY OF THE INVENTION

The present invention has been accomplished under the circumstances in view. It is the main object of the present invention to provide electrode plates for an ozone generator which applies low voltage for generating ozone. The electrode plates are made by semiconductor micromachining technique so that several thousands of discharge tips (discharge portions) are provided within one square centimeter area, and the discharge space is within the confines of hundred micrometers. Because the discharge space is minimized, the voltage value for the cathode electrode can be greatly decreased.

It is another object of the present invention to provide an electrode plate for an ozone generator which greatly improves ozone generating concentration. This object is achieved by dividing the discharge portions into several discharge regions by insulative means, and respectively connecting to a low voltage terminal (i.e. as a cathode electrode). Because the number of discharge tips (discharge portions) within one square centimeter area is greatly increased and every discharge region can be independently driven to discharge electricity, ozone generating concentration can be greatly increased. Because each discharge region of the electrode plate can be independently controlled with a control circuit, the ozone generating concentration can be controlled by selectively activating the discharge regions.

It is still another object of the present invention to provide an electrode plate for an ozone generator which minimizes the size of the ozone generator, enabling it to be made portable and small.

DETAILED DESCRIPTION OF THE PREFERRED EMBODIMENT

Figure 1:
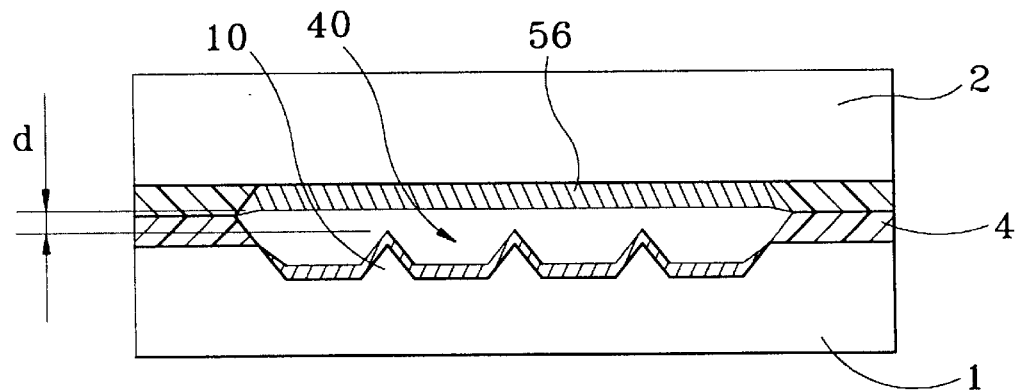
FIG. 1 shows a base structure of an electrode plate according to the present invention.

Referring to FIG. 1, an electrode plate in accordance with a first embodiment of the present invention comprises a cathode electrode 1, a anode electrode 2, and an insulative layer 4 sandwiched in between the cathode electrode 1 and the anode electrode 2. The cathode electrode 1 comprises a plurality of discharge portions 10 facing the anode electrode 2 and formed by a semiconductor micromachining technique. The cathode electrode 1 and the anode electrode 2 form the two opposite terminals of the electrode plate. The insulative layer 4 bonds the cathode electrode 1 and the anode electrode 2 together, enabling the space between the discharge portions 10 and the anode electrode 2 to be maintained within hundred micrometers, so that the discharge voltage can be greatly reduced. The two terminals of the electrode plate, namely, the cathode electrode 1 and the anode electrode 2 can be directly connected to DC or AC without affecting the discharging effect of the electrode plate.

Because the cathode electrode 1 and the anode electrode 2 are bounded together by semiconductor micromachining technique, the bonding precision is in the nano meter ($10^{-9}$ m) scale. Hence, it is easy to precisely achieve a discharge distance "d" of hundred microns. Because the discharge portions 10 are formed by semiconductor micromachining technique, their size can be controlled within several ten microns, the radius of curvature of the tip of each discharge portion 10 can be controlled within one micron, and several thousands of the discharge portions 10 can be formed within one square centimeter area. Therefore, the discharging voltage can be reduced to as low as several hundred volts.

Figure 2:
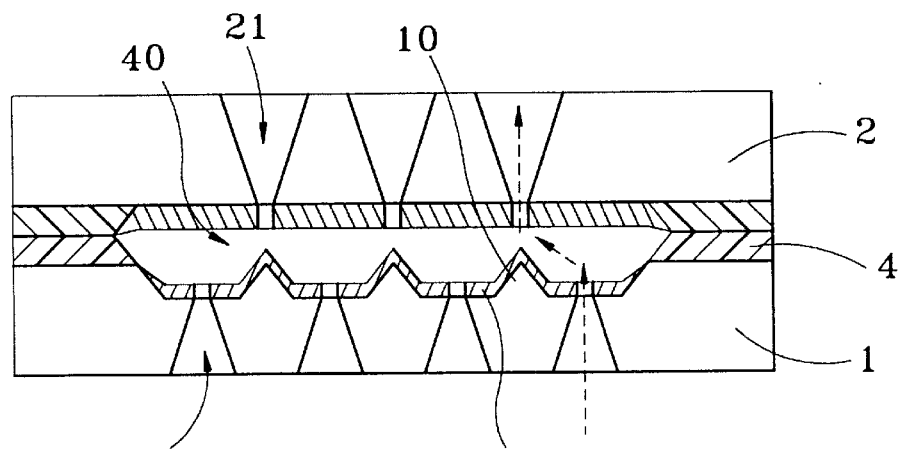
FIG. 2 is a sectional view of an electrode plate according to a first embodiment of the present invention.

Furthermore, the insulative layer 4 has an air passage 40 for delivering air and ozone. Air vents 11;21 are respectively formed in the cathode electrode 1 and the anode electrode 2 in a staggered manner for ventilation (see FIG. 2). Alternatively, the air vents 11;21 can be respectively aligned. However, if the air vents 11 of the cathode electrode 1 and the air vents 21 of the anode electrode 2 are aligned, less air will pass through the discharge space. Therefore, the air vents 11;21 are preferably arranged in a staggered manner.

Figure 3:
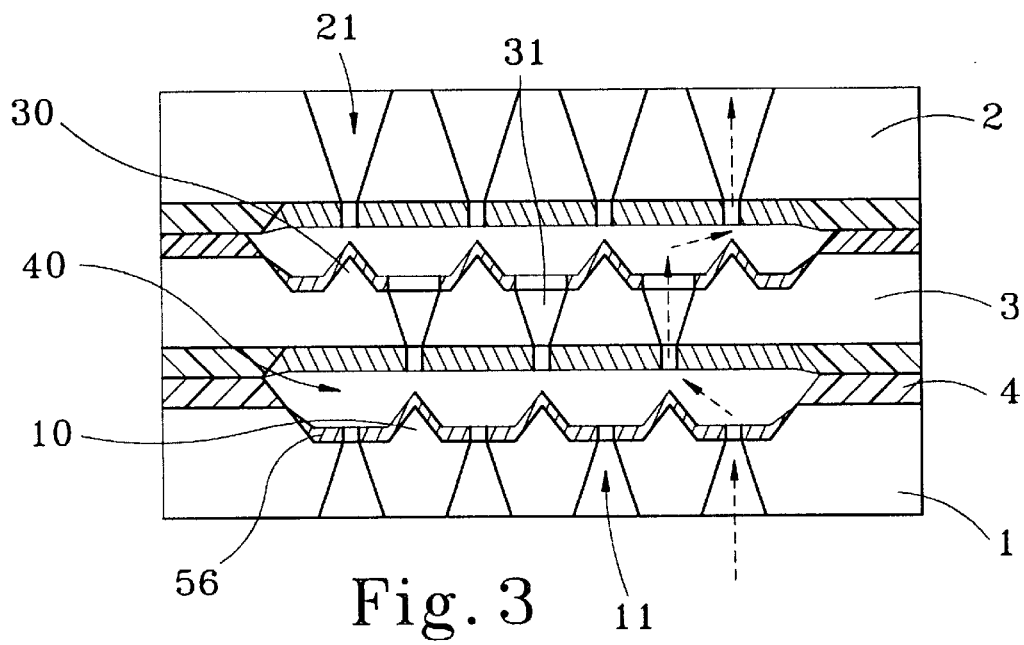
FIG. 3 is a sectional view of an electrode plate according to a second embodiment of the present invention.

FIG. 3 shows an electrode plate according to a second embodiment of the present invention, in which a grid electrode 3 is disposed between the cathode electrode 1 and the anode electrode 2. The grid electrode 3 has a plurality of air vents 31 respectively aligned with the discharge portions 10 of the cathode electrode 1, and a plurality of discharge portions 30 respectively facing the air vents 21 of the anode electrode 2 so that the anode electrode 2 will connect to the highest voltage terminal, the grid electrode 3 will connect to the higher voltage terminal, and the cathode electrode 1 will connect to the lowest voltage terminal. Therefore, electricity can be discharged at each two adjacent electrodes, and the concentration of ozone passing through the air vents 11;21;31 is gradually increased. By increasing the number of the grid electrode 3 between the cathode electrode 1 and the anode electrode 2, the concentration of ozone can be more increased.

Figure 4:
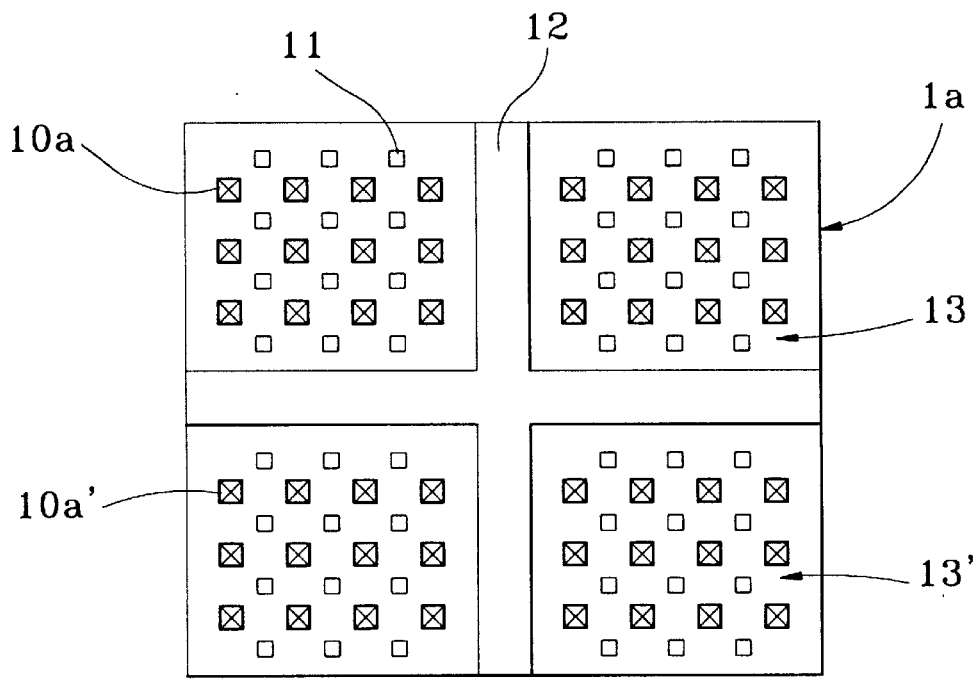
FIG. 4 is a top plain view of a cathode electrode for an electrode plate according to a third embodiment of the present invention.
Figure 5:
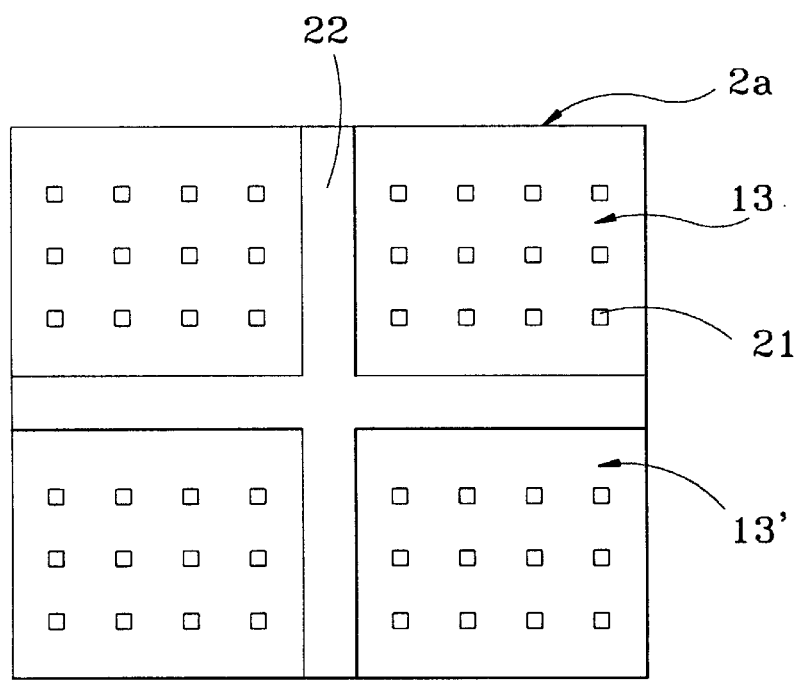
FIG. 5 is a top plain view of a anode electrode for an electrode plate according to the third embodiment of the present invention.

FIGS. 4 and 5 show a cathode electrode 1a and a anode electrode 2a according to a third embodiment of the present invention. The cathode electrode 1a comprises a plurality of discharge portions 10a;10a' divided by an insulative bank 12 into a plurality of discharge regions 13;13' respectively connected to low voltage terminal. The anode electrode 2a is divided by an insulative bank 22 into a plurality of discharge regions 13;13' corresponding to the discharge regions 13;13' of the cathode electrode 1a. The discharge regions 13;13' of the anode electrode 2a are respectively connected to high voltage terminal. When an voltage source is connected to the cathode electrode 1a and the anode electrode 2a, corona discharge occurs respectively between the discharge regions 13;13'.

As indicated above, the cathode electrode 1 and the anode electrode 2 are made by semiconductor micromachining technique, therefore the density of the discharge portions 10 can be greatly increased, the discharge distance "d" and the radius of curvature of the discharge portions 10 can be controlled to a small scale.

The aforesaid embodiments are for purposes of illustration only, and are not intended as a definition of the limits and scope of the invention disclosed. The electrodes 1;2;3 of the electrode plate of every embodiment of the present invention can be modified, so that the number of electrodes 1;2;3 can be changed subject to different conditions (such as ozone concentration required).

Figure 6:
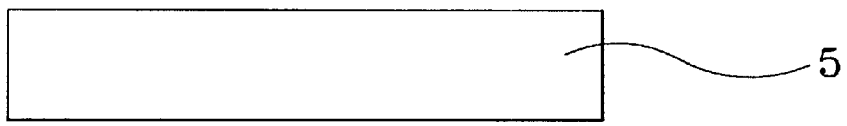
FIG. 6 is a cross-section view of a substrate for a cathode electrode according to the present invention.
Figure 7A:
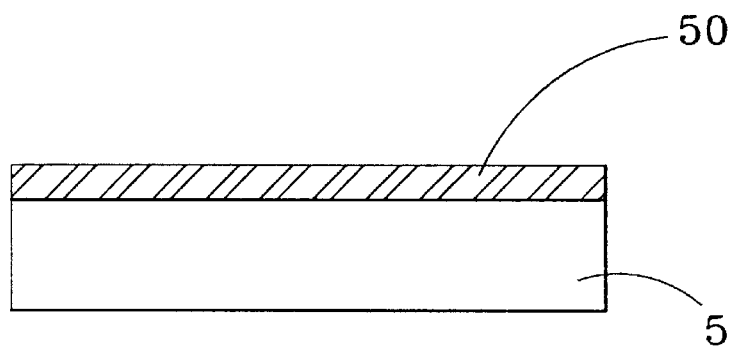
FIGS. 7A–7K explains the processing procedures of the production of a cathode electrode according to the present invention.
Figure 7B:
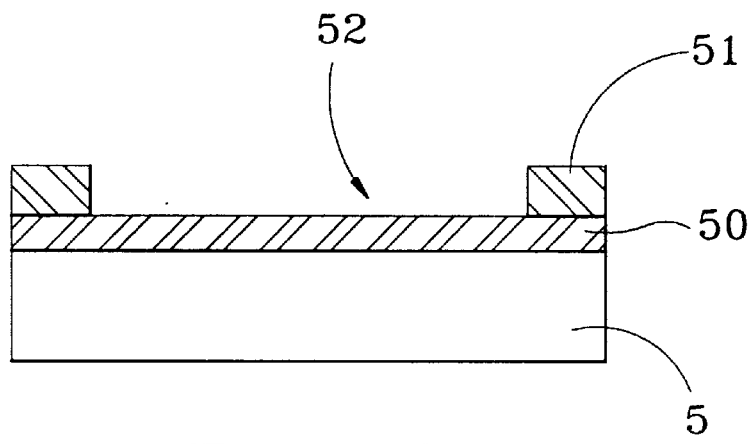
Figure 7C:
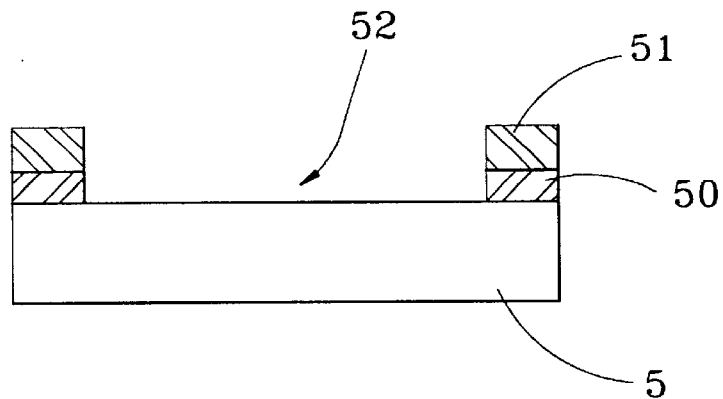
Figure 7D:
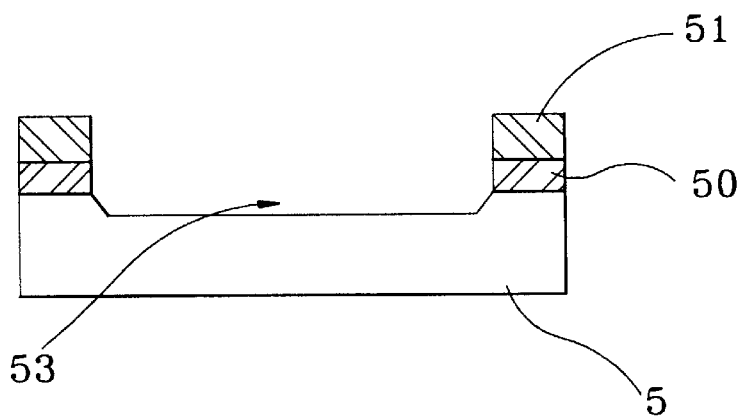
Figure 7E:
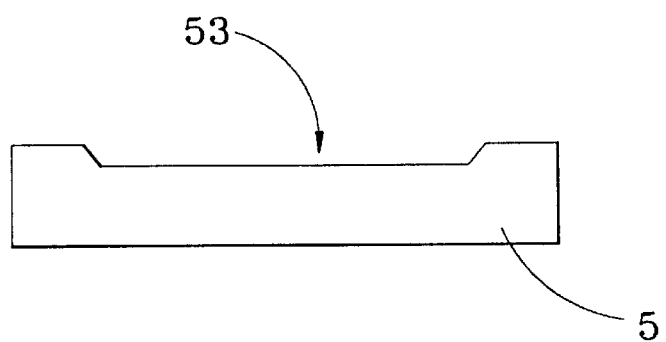
Figure 7F:
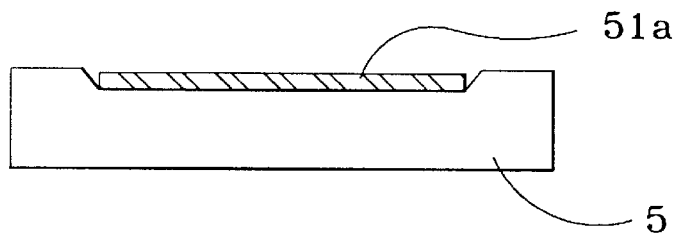
Figure 7G:
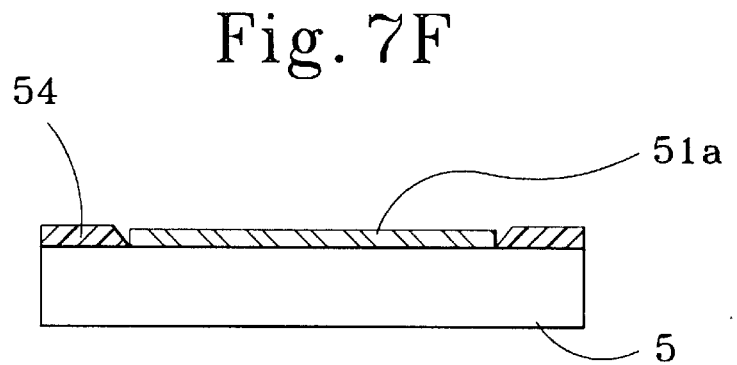
Figure 7H:
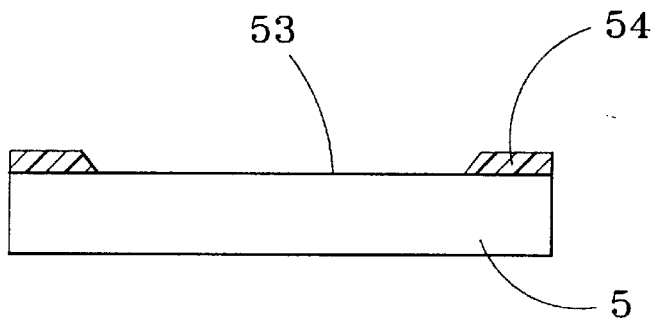
Figure 7I:
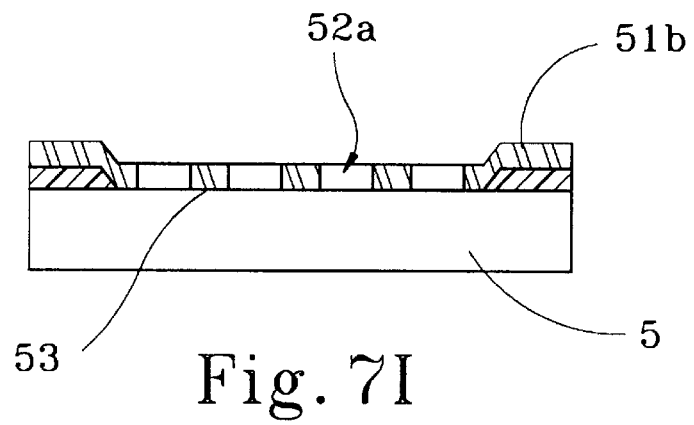
Figure 7J:
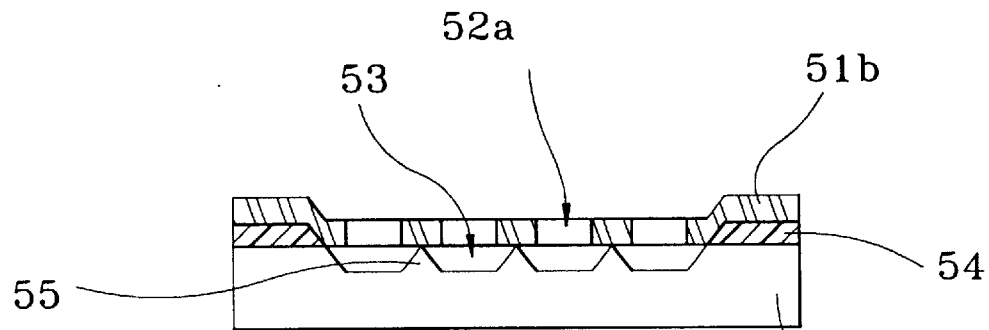
Figure 7K:
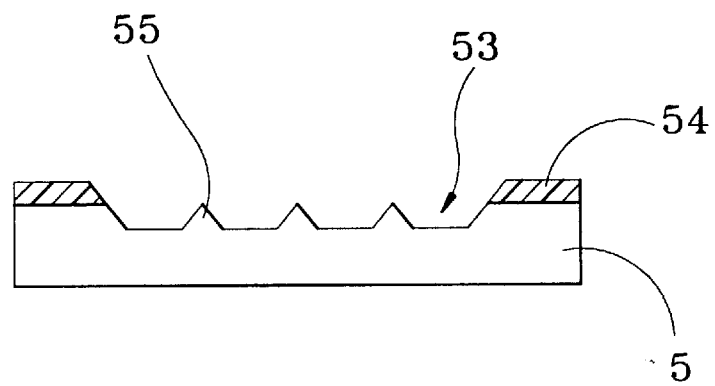
Figure 8:
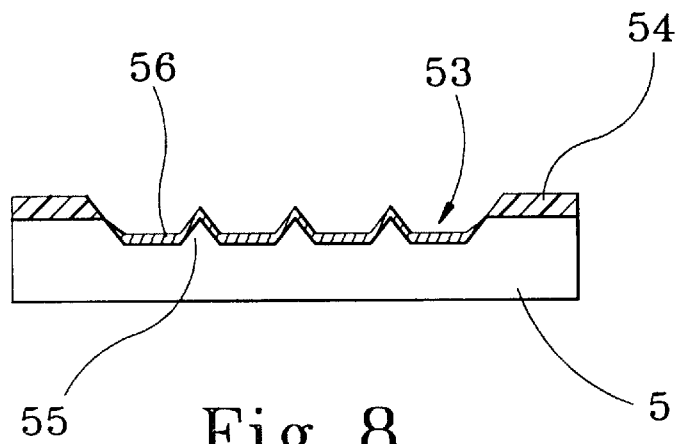
FIG. 8 shows a cathode electrode finished according to the present invention.

Referring to FIGS. from 6 to 8, the fabrication of the cathode electrode 1, the anode electrode 2, and the grid electrode 3 are made by semiconductor micromachining technique, which includes surface mircromachining technique and bulk micromachining technique. The fabrication process of for example the cathode electrode 1 comprises the steps of:

(i) preparing a substrate 5, for example, p-Si (see FIG. 6);

(ii) depositing a shielding layer ($Si_3N_4$) 50 on one side of the substrate 5 (see FIG. 7);

(iii) coating a photoresist 51 on the shielding layer 50, using a patterned mask to transfer the designated pattern to the photoresist 51 with ultraviolet light so as to form an opening 52, and then removing the non-patterned part of the photoresist 51 with the developing solution;

(iv) etching the shielding layer 50 below the opening 52, permitting the substrate 5 to be exposed (see FIG. 7C);

(v) anisotropic and selective etching the substrate 5 covered with the developed photoresist 51, (by using KOH etch as etchant) so as to form an electrode area 53 (see FIG. 7D), and (vi) using phosphoric acid to remove the photoresist 51 and then etching the rest of shielding layer 50 (see FIG. 7E);

(vii) coating a photoresist 51a on the substrate 5 and using a patterned mask to transfer the designated pattern to the photoresist 5a with ultraviolet light which permit the non-electrode area of the substrate 5 to be exposed (see FIG. 7F);

(viii) forming a silicon dioxide ($SiO_2$) layer on the whole non-electrode area of the substrate 5 to form an insulative layer 54 (namely, the aforesaid insulative layer 4) (see FIG. 7G) with deposition or oxidation process;

(ix) removing the developed photoresist 51a (see FIG. 7H);

(x) forming a photoresist 51b on the substrate 5, using a patterned mask to transfer the designated pattern to the photoresist 51b with ultraviolet light which enable to form a plurality of patterned openings 52a in the photoresist 51b above the electrode area 53 (see FIG. 7I);

(xi) anisotropic and selective etching the electrode area 53 below the openings 52a, so as to form a plurality of discharge portions 55 above the electrode area 53 (see FIG. 7J);

(xii) removing the photoresist 51b (see FIG. 7K); and (xiii) coating an electrically conductive material 56 on the discharge portions 55 (see FIG. 8).

By means of the aforesaid processes, the cathode electrode 1 is to be made comprising several thousands of discharge portions 55 on the substrate 5 within every square centimeter area. The aforesaid steps from (ii) to (xii) are the processes of micromachining to form the discharge portions 55 on the substrate 5; the formation of the electrically conductive material 56 of the step (xiii) can be achieved by micro-electroplating or sputtering.

The anode electrode 2 and the grid electrode 3 are to be made using the same semiconductor micromachining technique as for producing the cathode electrode 1. When the cathode electrode 1, the anode electrode 2 and the grid electrode 3 are made, they are fastened together by bonding method. The insulative layer 4 can be directly formed on the cathode electrode 1 or the anode electrode 2, or separately made and then secured to the cathode electrode 1 and anode electrode 2.

Furthermore, the anode electrode 2 can be made by forming the conductive material 56 on the substrate 5 corresponding to the pattern of the discharge area (namely, the electrode area 53) by means of semiconductor micromachining technique, so that the conductive material 56 form a discharge electric space against the discharge portions 55. The aforesaid air vents 11;21;31 can be formed by KOH etch on the substrate 5. The conductive material 56 thereon can be achieved by dry etching.

We claim:

1. An electrode plate for use in an ozone generator, comprising:

a cathode electrode connected to a low voltage terminal and having a plurality of discharge portions at one side;

an anode electrode connected to a high voltage terminal for acting with said cathode electrode; and an insulative layer sandwiched between said cathode electrode and said anode electrode, keeping said discharge portions to be spaced from said anode electrode within hundred micrometers;

wherein said cathode electrode and said anode electrode respectively comprise a plurality of air vents arranged in a staggered manner.

2. The electrode plate according to claim 1, wherein said discharge portions are provided with a density which is above several hundreds, to several thousands per square centimeter area.

3. The electrode plate according to claim 1, wherein said insulative layer comprises an air passage for passing air between said cathode electrode and said anode electrode.

4. The electrode plate according to claim 1, which further comprises at least one grid electrode insulated between said cathode electrode and said anode electrode, said cathode electrode and said anode electrode being spaced within hundred micrometers, said grid electrode having a plurality of discharge portions at one side corresponding to the air vents of said anode electrode, and a plurality of air vents corresponding to the discharge portions of said cathode electrode.

5. The electrode plate according to claim 4, wherein said cathode electrode, said grid electrode and said anode electrode are respectively connected to different voltage terminals in the order from the lowest voltage terminal to the highest voltage terminal.

6. The electrode plate according to claim 1, wherein said discharge portions of said cathode electrode are divided into a plurality of discharge regions by electrically insulative banks, which are respectively connected to said low voltage terminal.

* * * * *